Nov. 8, 1966  M. A. WILLIAMS  3,284,211

METHOD OF PREPARATION OF FAT COATED FEED ANNULI

Filed Dec. 17, 1963  2 Sheets-Sheet 2

INVENTOR:
MERL A. WILLIAMS
BY
*Dawson, Tilton, Fallon, Lungmus & Alexander*
ATT'YS

United States Patent Office 3,284,211
Patented Nov. 8, 1966

3,284,211
METHOD OF PREPARATION OF FAT COATED
FEED ANNULI
Merl A. Williams, Craigville, Ind., assignor to Central
Soya Company, Inc., Fort Wayne, Ind., a corporation
of Indiana
Filed Dec. 17, 1963, Ser. No. 331,147
1 Claim. (Cl. 99—2)

This invention relates to an animal food product and a method of preparation thereof, and, more particularly, to a food for pets such as dogs.

It is an object of the invention to provide an animal food in which at least the surface is uniformly impregnated with fat which limits the development of crumbling and fines during handling, particularly packaging. Since fat enhances palatability, the food is more attractive to pets because all of the particles are uniformly impregnated, whereby effective use is made of the food—i.e., none is rejected by the pets for lacking the prime tallow attractant.

Another object of the invention is to provide an animal food having a unique shape which facilitates the above-mentioned uniform impregnation and which additionally facilitates other manufacturing operations such as expansion drying and tumbling.

Another problem solved by this invention is the problem of uneven compaction and burning on the outer surface of a large extruded particle. In the conventional method of producing a large particle size dog food, of the order of one inch in diameter, the die must be made excessively deep in order to provide a relatively long travel for the material going through the die so that sufficient frictional forces are presented to the material entering the die to obtain compaction of the material in the center of the extrusion mass. In so doing, the material which is immediately adjacent to the surface of the die hole is greatly retarded in its speed of travel through the die when compared with the speed of travel of the material in the center of the extruded mass.

This results in excessive frictional heat being applied to the material adjacent to the inner surface of the die hole (the outer surface of the extruded particle) with the result that these outer layers of material are excessively cooked, compacted, or burned during travel through the die. Another difficulty arises in cutting such a material with a rotating knife as it extrudes from the die surface because the outer overcooked surfaces may be more brittle than the properly cooked material in the center of the extrusion and will tend to crack off, producing fines, when the knife cuts through the mass.

In the subject invention, additional frictional surfaces are provided by the center pin in the die, so that the die need not have as long a travel and the excessive frictional forces on the outside of the particle are not necessary.

Still another object of the invention is to provide an animal food particle or element having the shape generally of a cylindrical annulus. When this is produced by extrusion, the shape is particularly advantageous in providing a large area for substantial flash cooling to avoid inter-element sticking. The annular shape is advantageous when heated in providing controlled, but rapid, diffusion of water out of the particle units or annuli.

Yet another object of the invention is to provide a procedure for producing animal food particles of unique shape wherein the particle is in its final form at the time of extrusion, whereby the particle is maintainable in a warm or heated condition throughout the remaining processing, particularly during the addition of fat attractant.

The invention provides two important new results: (1) in the form of the product there is made possible more effective use, since there is a lack of fines and crumbling, yet the product is readily softenable for ingestion by the pet; and (2) in the process aspect, it is now possible to have a completely shaped form at the extruder die so that subsequent handling can insure uniform impregnation with the fat attractant and without the development of fines.

The invention is described in conjunction with the accompanying drawing, in which.

Figure 3:
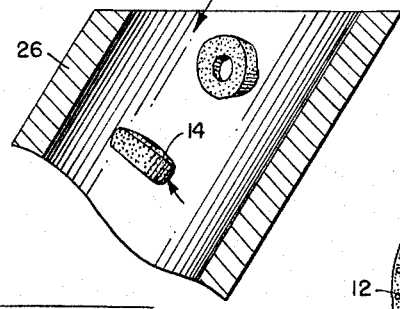
FIG. 3 is a perspective view of an animal food particle produced according to the invention.
Figure 4:
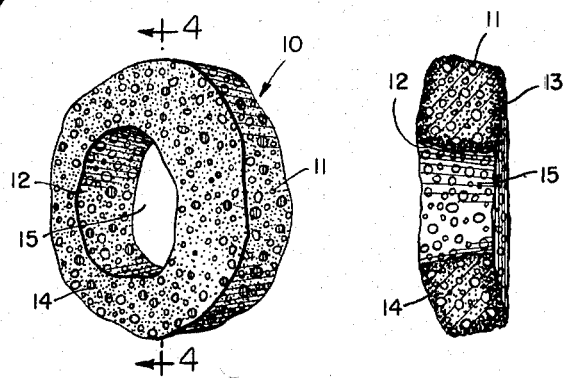
FIG. 4 is a sectional view taken along the line 4—4 of FIG. 3.

As seen in FIGS. 3 and 4, the particle is generally in the shape of a cylindrical annulus 10, and is seen to include a generally cylindrical outer wall 11 and a generally cylindrical inner wall 12 bounded by top and bottom walls 13 and 14. One of the end walls as at 14 is generally convex, and the inner cylindrical wall 12 defines a hollow axial opening 15. Further, this defines a cross-sectional configuration that is generally rectangular (see particularly FIG. 4).

The element 10 is advantageously produced through the use of extrusion apparatus described in my copending application Serial No. 301,131, filed August 9, 1963, now abandoned. For this purpose, the following ingredients are compounded: Meat meal, cornmeal, wheat red dog, fish meal, ground wheat, de-hulled soybean meal, feeding oatmeal, dry tomato pomace, dried whole whey, animal fat preserved with DHA 2%, flaked soybean hulls, brewer's dried yeast, vitamin A palmitate, vitamin E supplement, vitamin $D_2$ supplement, calcium pantothenate, niacin, riboflavin supplement, 0.5% salt, traces of manganese oxide, potassium iodide, ferrous carbonate, cobalt carbonate, copper oxide and zinc oxide, and a U.S. certified color.

Figure 2:
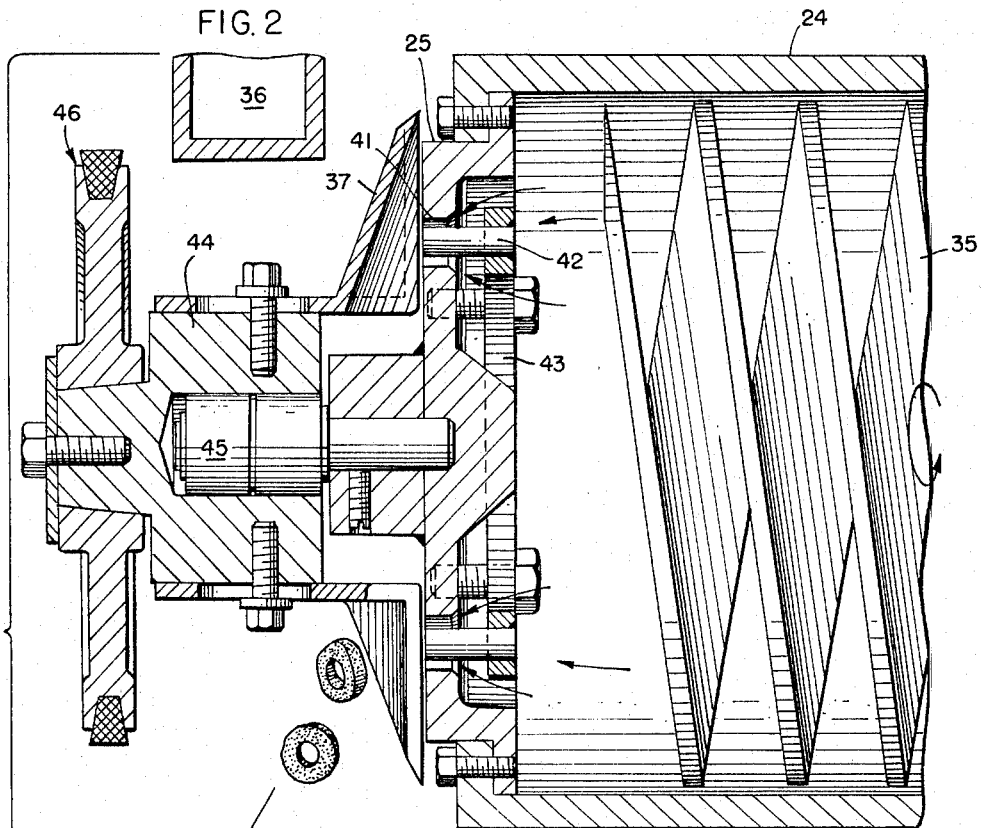
FIG. 2 is a fragmentary sectional view through the extruder die of the apparatus and which illustrates the expansion of the food particles during production.

The annulus 10 may be produced through an extrusion die of the character seen in FIG. 2, wherein the die openings are of the order of 13/16" in diameter, with the axial pin diameter for each opening being 7/16". This results in an annulus having an outer diameter following expansion from the die of the order of one inch and the bore diameter 15 being slightly less than the diameter of the pin resulting in the axial opening 15. Optimally, the thickness of the annulus is about one-half the radial width of the annular portion.

Figure 1:
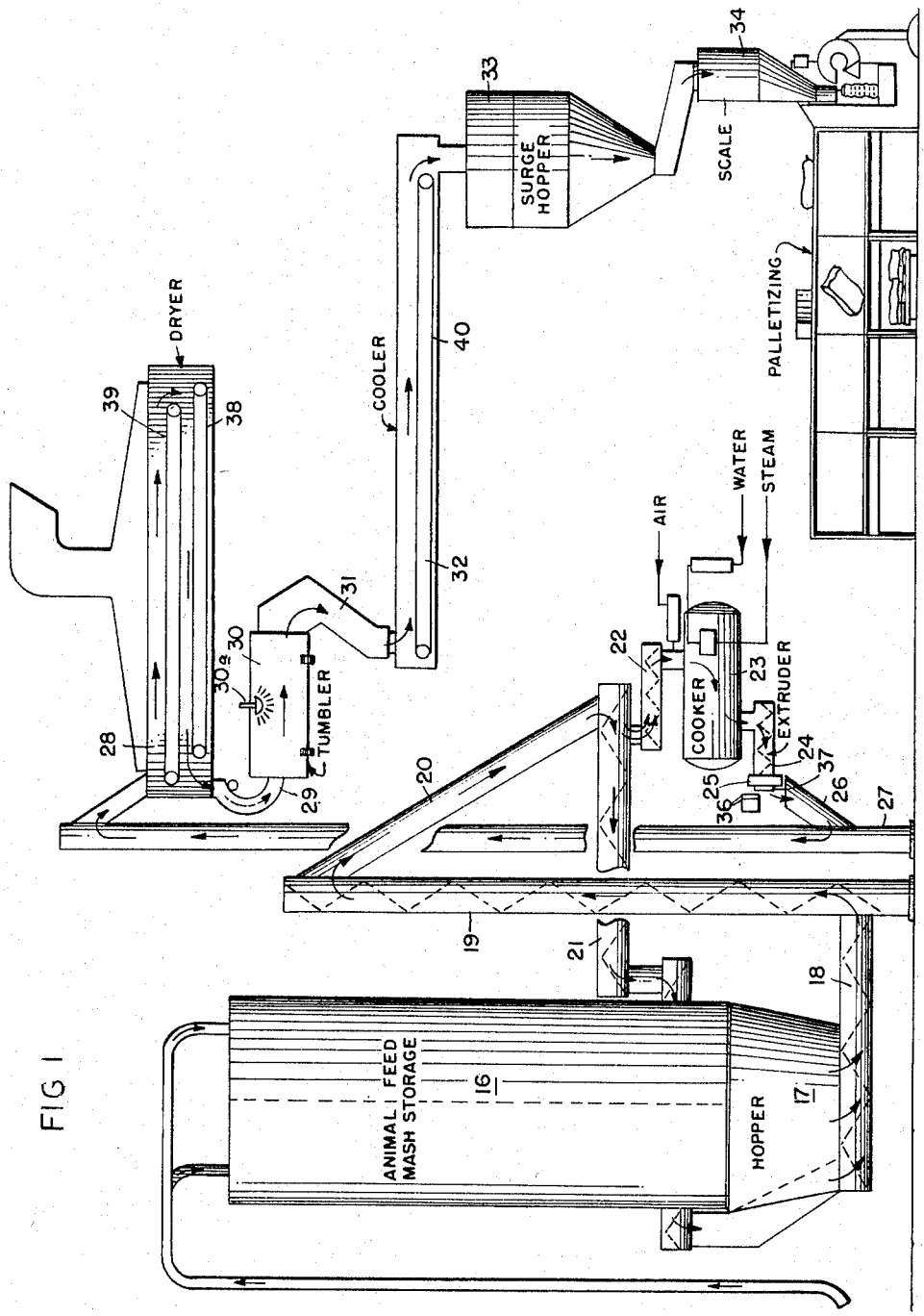
FIG. 1 is a schematic view of apparatus used in the production of the inventive animal food.

Referring now to FIG. 1, the apparatus which may be employed in the practice of the invention is seen to include a storage bin 16 for the animal feed mash. For ease in understanding, legends as well as numerals have been applied. The bottom portion of the bin 16 is equipped with a hopper 17 and screw conveyors 18 and 19 deliver the mash to a delivery pipe 20. The delivery pipe 20 communicates with other screw conveyors 21 and 22 to either recirculate the mash or deliver the same to a cooker 23. Following cooking of the mash, the mash is delivered to an extruder 24 equipped at one end with a die 25. This portion of the apparatus is seen in enlarged fragmentary form in FIG. 2.

At the die 25, the annuli 10 are formed and thereafter delivered through a chute 26 to a bucket conveyor 27. The bucket conveyor 27 elevates the extruded annuli to a dryer 28. Here, it will be appreciated that the arrangement presented conserves building space by virtue of superposing various pieces of equipment, but that in other arrangements different conveying apparatus may be employed for transporting the mash and extruded food particles. From the dryer 28, the annuli pass through a chute 29 to a tumbler 30, wherein fat is sprayed as at 30a onto the annuli to provide a meaty attractant for the pet to be fed with the annuli. The annuli, in exiting from the tumbler, pass through a chute 31 to a bagging from the tumbler, pass through a chute 31 to a cooler 32 and thence to a surge hopper 33, ultimately to a bagging The inventive annuli may be prepared according to the following example wherein reference is made to the apparatus just described.

Example

An animal food mash including about 20–32% crude protein, 2–8% crude fiber, 5–15% ash, and 50–70% grain (the grain providing some of the protein), is heated for about 3 minutes, using 10 p.s.i. steam to develop a temperature in the cooker 23 of the order of 230° F. The moisture content during this operation is increased to about 40% through the addition of water and the condensed steam.

Thereafter the cooked food passes through the extruder 24, which also is equipped with the usual feed screw 35 terminating in a die 25 such as is seen in FIG. 2, the food expanding upon leaving the die and flash cooling to a moisture content of the order of 28–30°. I provide an exhaust fan 36 (see FIG. 1) adjacent the extrusion die 25 to carry away the vaporized moisture and the heat generated by the extrusion, the die reaching a temperature of 330° F. and providing the latent heat of vaporization for the evaporated moisture. By virtue of reducing the moisture in the particles at the die (this being facilitated through the annular character which provides a substantial area of evaporation), the tendency of the particles to stick together or to deform due to too great plasticity, is avoided. The remaining moisture, however, maintains the annuli sufficiently flexible so as not to shatter during the subsequent handling.

The fan unit generally designated 36 in FIG. 1 thus aids in the flash drying and consequent expansion of the annuli 10 developed by the die 25 in combination with the rotating knife 37. The expansion of the annular particle occurs primarily on the leading face 14 developing the convexity apparent in FIG. 4, and it will be appreciated that the end faces 13 and 14 are relatively more porous than the inner and outer generally cylindrical surfaces 11 and 12—the latter having been compacted slightly more by the frictional engagement with the die 25. The extensive surface provided by the annulus 10 develops a high rate of flash evaporation of the moisture which reduces the "sticky" or adhesive character of the annuli and the plasticity so that they can be intermixed in the chute 26 without adhering together or deforming. On the other hand, sufficient moisture remains in each annulus as to give it an essentially resilient character whereby it can be handled as indicated in FIG. 1 without shattering, crumbling, etc.

The annuli are then transported by the bucket conveyor 27 to the dryer 28 which, in the illustration given, is seen to have two passes provided by the conveyor belts of wire mesh construction designated 38 and 39. I find it advantageous to maintain the annuli within the dryer for about 20 minutes, with the entering air temperature about 250° F. and 210° for the exiting air. This reduces the moisture content in the annuli to 11–12%, and generally in the range of about 10–15%.

Thereafter, in passing through the chute 29, the annuli which are partially dried, enter the tumbler 30 which is essentially a tilted cylindrical rotatable mechanism equipped with interior sprays where the annuli have a temperature of the order of 130° F. and wherein the sprays add about 3% prime tallow which is liquefied by heating to a temperature of about 130° F. The prime tallow or fat attractant is beneficialy fortified with vitamin A. The fat has a congealing temperature of the order of 96° F., and I find that making a temperature suitably above this level develops advantageous coverage of the annuli. The tumbler is of relatively large diameter, of the order of three to five feet, so that the annular particles for the most part rest on what can be considered flat surfaces, with the particles disposed end downwardly, i.e., lying on the end surfaces 13 and 14. These are the more porous surfaces and are usually alternately exposed by virtue of the tumbling so that even though each end surface is exposed only approximately one-half the time, there is ample opportunity for the prime tallow to penetrate by virtue of the greater porosity of these end surfaces.

Thereafter, the annular particles are conducted through the chute 31 to a single pass cooler 40 which again is equipped with a conveyor belt as at 39 of the open mesh type. The residence time in the cooler illustrated is of the order of two minutes at room temperature, wherein the moisture content of the particles is reduced to the range of 8½ to 9½%. This results in a product discharged through the bagging machine 34 which meets the following specifications:

Not less than 24% protein
Not less than 7% fat
Not more than 4.5% crude fiber
Not more than 10% ash
Not more than 12% moisture Additionally, the particles have a bulk density of 18–21 lbs. per cubic foot, and experience has shown that less than 3% of the weight of the particles passes through a ½" mesh screen.

The possibility of deformation of the product as the development of fines, particularly during the manufacturing operation, is substantially inhibited and controlled by the flash evaporation occurring at the extruder. The extrusion operation can be readily appreciated from a consideration of FIG. 2, wherein the extruder housing 24 is seen to include the advancing screw 35. Positioned in the path of the cooked food being advanced by the screw 35 is the die 25 forming the end closure for the extruder housing 24. The die plate 25 is apertured as at 41 at a plurality of points arranged in an arc to develop the annuli 10. Cooperating with the die opening 41 are pins 42 carried on a pin-providing plate 43, all of which can be seen in greater detail in my above-mentioned copending application. As the dough is urged through the die opening 41, discrete annuli 10 are cut therefrom by virtue of the rotating knife 37, which is seen to be provided as part of a hub 44 journaled about bearings 45 and rotated by means of a belt and pulley system generally designated 46.

The knife blades 37 operate at relatively high speed to shear off the annular extrusion and permit the development of the convex end wall 14 clearly seen in FIG. 4 and at the bottom of FIG. 2. The slightly convex end wall 14 provides an extensive surface for evaporation of the moisture from the animal food, so that any tackiness is quickly eliminated. This results in the various annular particles maintaining their integrity notwithstanding mixing, jumbling, tumbling, etc., during the remainder of the processing.

While in the foregoing specification a detailed description of an embodiment of the invention has been set down for the purpose of explanation thereof, many variations in the details herein given may be made by those skilled in the art without departing from the spirit and scope of the invention.

I claim:

A method of animal food production comprising heating and moistening an animal food mixture, in a pressure cooking chamber, said mixture including 20–32% crude protein 2–8% crude fiber, 5–15% ash and 50–70% grain to a temperature of about 230° F., and a moisture content of about 40%, passing said mixture to a screw extruder and uniformly extruding said food as an annulus of about 1″ diameter, while simultaneously transversely severing the annulus to provide a plurality of discrete annuli and while exhausting air about the severed annuli to reduce the moisture content therein to about 25–35% and expanding the same, drying said annuli to reduce the moisture content therein to about 10–15%, spraying liquid fat on said annuli at a temperature above the melting point of the fat while tumbling said annuli to add about 3% fat to the annuli, and cooling said annuli to provide an animal food having a surface substantially impregnated with a layer of fat.

References Cited by the Examiner

UNITED STATES PATENTS

| | | | |
|---|---|---|---|
| 1,924,826 | 8/1933 | Anderson | 99—2 |
| 3,014,800 | 12/1961 | Guidarelli | 99—2 |
| 3,119,691 | 1/1964 | Ludington | 99—2 |
| 3,139,342 | 6/1964 | Linskey | 99—2 |

A. LOUIS MONACELL, *Primary Examiner.*

DANIEL J. DONOVAN, *Assistant Examiner.*